United States Patent [19]

Goerrissen et al.

[11] Patent Number: 4,780,498

[45] Date of Patent: Oct. 25, 1988

[54] MOLDING MATERIALS OF POLYOXYMETHYLENE HOMOPOLYMERS AND/OR COPOLYMERS AND THERMOPLASTIC POLYURETHANE ELASTOMERS HAVING IMPROVED HEAT STABILITY, THEIR PREPARATION AND THEIR USE

[75] Inventors: Heiner Goerrissen, Ludwigshafen; Dietrich Saenger, Frankenthal; Wilhelm Schuette; Manfred Walter, both of Speyer, all of Fed. Rep. of Germany

[73] Assignee: BASF Aktiengesellschaft, Fed. Rep. of Germany

[21] Appl. No.: 77,631

[22] Filed: Jul. 24, 1987

[30] Foreign Application Priority Data

Aug. 22, 1986 [DE] Fed. Rep. of Germany ....... 3628559

[51] Int. Cl.$^4$ .............................................. C08K 3/34
[52] U.S. Cl. ..................... 524/456; 524/451; 524/542; 524/590; 524/593
[58] Field of Search ................................ 524/456, 542

[56] References Cited

U.S. PATENT DOCUMENTS

| | | | |
|---|---|---|---|
| 3,850,873 | 11/1974 | Wurmb et al. | 524/542 |
| 3,853,806 | 12/1974 | Golder | 524/456 |
| 3,901,846 | 8/1975 | Freed | 524/456 |
| 4,366,264 | 12/1982 | Wawzonek | 524/456 |
| 4,517,319 | 5/1985 | Reske et al. | 524/456 |
| 4,582,869 | 4/1986 | Waggoner | 524/542 |
| 4,689,373 | 8/1987 | Auerbach et al. | 525/399 |

FOREIGN PATENT DOCUMENTS

| | | |
|---|---|---|
| 0116456 | 8/1984 | European Pat. Off. . |
| 0117664 | 9/1984 | European Pat. Off. . |
| 2051028 | 4/1971 | Fed. Rep. of Germany . |
| 3441546 | 5/1986 | Fed. Rep. of Germany ...... 524/456 |
| 0999422 | 7/1965 | United Kingdom . |
| 1017244 | 1/1966 | United Kingdom . |

*Primary Examiner*—John C. Bleutge
*Assistant Examiner*—David W. Woodward
*Attorney, Agent, or Firm*—Keil & Weinkauf

[57] ABSTRACT

Molding materials of
(A) one or more polyoxymethylene homopolymers and/or copolymers and
(B) one or more thermoplastic polyurethane elastomers,
(C) with or without additives, contain, as an additive,
(D) one or more alkaline earth metal silicates, advantageously in an amount of from 0.005 to 2% by weight, based on the weight of the components (A) and (B), for improving the heat stability, reducing the tendency to discoloration and minimizing the free formaldehyde content.

To prepare the molding materials, the components (A), (B), (D) and, if required (C) are advantageously melted together in an extruder at from 150° to 260° C.

The molding materials are useful for the production of films or moldings, which are used, for example, in the automotive, electrical appliances and electronics industries.

4 Claims, No Drawings

MOLDING MATERIALS OF POLYOXYMETHYLENE HOMOPOLYMERS AND/OR COPOLYMERS AND THERMOPLASTIC POLYURETHANE ELASTOMERS HAVING IMPROVED HEAT STABILITY, THEIR PREPARATION AND THEIR USE

Molding materials which can be processed by a thermoplastic method and are based on high molecular weight polyoxymethylenes (abbreviated to POM below) and thermoplastic polyurethane elastomers (abbreviated to TPU below) are known and are described in, for example, DE-A-No. 1 193 240 (GB-A-No. 1017 244), DE-A-No. 20 51 028, EP-A-No. 0 116 456 and EP-A-No. 0 117 664.

Moldings obtained from such molding materials have a high tensile strength and extremely great toughness and compressive strength.

According to DE-A-No. 33 03 760 (U.S. Pat. No. 4,517,319), the notched impact strength can be improved by incorporating fillers having a mean particle size of less than 10 μm into mixtures of POM and TPU having a Shore hardness A of not more than 90. Examples of suitable fillers include oxides, eg. magnesium oxide, zinc oxide, aluminum oxide and titanium dioxide, silane-modified silica, hydroxides, such as calcium or aluminum hydroxide, carbonates, eg. magnesium, calcium or zinc carbonate, silicates, such as asbestos minerals, mica, feldspars, Wollastonite, talc, zeolites and finely divided glasses, sulfates, eg. calcium or barium sulfate, phosphates, such as tricalcium phosphate, fluorapatite and phosphorite, sulfides, eg. zinc sulfide, cadmium sulfide or heavy metal sulfides, and carbon black and graphite.

Furthermore, DE-A-No. 1 208 490 (GB-A-No. 999 422) discloses that POM which contain metals, metal oxides, metal carbonates, metal silicates, carbon, silica and/or boron and may contain glass fibers and asbestos fibers can be used for the production of composites.

The known POM/TPU blends and POM possess good mechanical properties, for example electrical properties, toughness and abrasion resistance. However, known POM/TPU blends possess heat stability which is insufficient for some applications, has an adverse effect on processng to moldings and, for example, contributes to deposits on the mold or to deterioration of the mold release properties and/or leads to discoloration and a deterioration in the mechanical properties during subsequent use of the moldings. Another disadvantage is that the blends may still contain formaldehyde adducts which may lead to odor nuisance during processing at elevated temperatures, as a result of formaldehyde elimination.

It is an object of the present invention to improve the heat stability of POM/TPU blends and to reduce the tendency to discoloration and at the same time to minimize any residual formaldehyde content.

We have found that this object is achieved, surprisingly, by the addition of specially selected additives.

The present invention therefore relates to molding materials of
(A) one or more polyoxymethylene homopolymers and/or copolymers and
(B) one or more thermoplastic polyurethane elastomers,
(C) with or without additives, which contain
(D) as an additive for improving the heat stability, one or more alkaline earth metal silicates, preferably one or more alkaline earth metal silicates of the formula $$MeO \cdot x\ SiO_2 \cdot n\ H_2O,$$

where Me is an alkaline earth metal, preferably calcium or magnesium, in particular magnesium, x is from 1.4 to 10, preferably from 1.4 to 6, and n is greater than or equal to 0.

The present invention furthermore relates to a process for the preparation of molding materials and the use of these molding materials for the production of films or, preferably, moldings.

In order to achieve very good heat stability in conjunction with little tendency to discoloration and a minimum formaldehyde content, the POM/TPU blend advantageously contains from 0.005 to 2, preferably from 0.02 to 0.5, % by weight, based on the total weight of components (A) and (B), of one or more alkaline earth metal silicates. Calcium silicates and/or magnesium silicates, in particular those which may be represented by the above formula $$MeO \cdot x\ SiO_2 \cdot n\ H_2O,$$

are preferably used.

The additives (D) are advantageously used in finely milled form. Products having a mean particle size of less than about 100 μm, preferably less than 50 μm, are particularly suitable.

The preferably used calcium silicates and magnesium silicates can be characterized, for example, by the following data:

Content of CaO or MgO: from 4 to 32, preferably from 8 to 30, in particular from 12 to 25, % by weight Ratio of $SiO_2$ to CaO or $SiO_2$ to MgO (mole/mole): from 1.4 to 10, preferably from 1.4 to 6, in particular from 1.5 to 4

Bulk density: from 10 to 80, preferably from 10 to 40, g/100 ml

Mean particle size: less than 100 μm, preferably less than 50 μm

Loss on ignition: less than 40, preferably less than 30, % by weight.

Other suitable alkaline earth metal silicates for the preparation of the novel molding materials are of course silicates which, in addition to alkaline earth metal ions, preferably $Ca^{2+}$ and/or $Mg^{2+}$ ions, also contain smaller amounts of other metal ions, for example beryllium, iron, titanium or, preferably, aluminum ions in bound form, eg. magnesium aluminum silicates.

For the preparation of the novel molding materials, the ratios of components POM (A) and TPU (B) can be varied within wide limits. POM/TPU blends which contain from 40 to 95, preferably from 60 to 90, % by weight of one or more polyoxymethylene homopolymers and/or copolymers and from 60 to 5, preferably from 40 to 10, % by weight of one or more thermoplastic polyurethane elastomers, the percentages being based on the total weight of components (A) and (B), have proven particularly useful and are therefore preferably used.

(A) Suitable polyoxymethylenes (A) are homopolymers of formladehyde or copolymers of formaldehyde and of trioxane with cyclic and/or linear formals, such as butanediol formal, or epoxides, such as ethylene oxide or propylene oxide. As a rule, the homopolymers have thermally stable terminal groups, such as ester or ether groups. The copolymers of formaldehyde or of trioxane advantageously contain more than 50%, in particular more than 75%, of oxymethylene groups. Copolymers which contain not less than 0.1% of groups of the comonomer which have two or more adjacent carbon atoms in the chain have proven particularly useful. Polyoxymethylenes which contain from 1 to 10% by weight of comonomers have become particularly important industrially. Such copolymers are obtainable in a conventional manner by cationic copolymerization of trioxane with suitable comonomers, such as cyclic ethers or acetals, eg. ethylene oxide, 1,3-dioxolane, 1,3-dioxane or 1,3-dioxacycloheptane, or with linear oligoformals or polyformals, such as polydioxolane or polybutanediol formal. As a rule, the polyoxymethylenes used have a number average molecular weight $M_n$ of from 2,000 to 100,000, preferably from 10,000 to 100,000, and an MFI of from 0.5 to 200, preferably from 1 to 50, at 190° C. and 21.17 N, according to DIN 53,735. Polymers synthesised from trioxane and from 1 to 10 mol % of ethylene oxide, 1,3-dioxolane or butanediol formal have become particularly important. As stated above, the novel molding materials advantageously contain from 40 to 95% by weight, based on the weight of the components (A) and (B), of one or more polyoxymethylenes.

If required, compounds having a plurality of polymerizable groups in the molecule, for example alkylglycidyl formals, polyglycol diglycidyl ethers, alkanediol diglycidyl ethers or bis-(alkanetriol) triformals, are used as additional comonomers for trioxane, in an amount from 0.05 to 5, preferably from 0.1 to 2, % by weight, based on the total amount of monomers.

(B) The novel molding materials contain, in addition to POM (A) as a basic plastic, thermoplastic polyurethane elastomers (TPU) prepared by the melt or, preferably, extrusion process. Suitable thermoplastic polyurethane elastomers can be prepared, for example, by reacting (a) organic, preferably aromatic diisocyanates,
(b) polyhydroxy compounds having molecular weights of from 500 to 8,000 and
(c) chain extenders having molecular weights of from 60 to 400, in the presence or absence of
(d) catalysts and
(e) assistants and/or additives.

Regarding the starting materials (a) to (c), catalysts (d) and assistants and additives (e) used for this purpose, the following may be stated:

(a) Examples of suitable organic diisocyanates (a) are aliphatic, cycloaliphatic and, preferably, aromatic diisocyanates. Specific examples are aliphatic diisocyanates, such as hexamethylene diisocyanate, cycloaliphatic diisocyanates, such as isophorone diisocyanate, 1,4-cyclohexane diisocyanate, 1-methyl-2,4- and 2,6-cyclohexane diisocyanate and the corresponding isomer mixtures, 4,4'- , 2,4'- and 2,2'-dicyclohexylmethane diisocyanate and the corresponding isomer mixtures, and preferably aromatic diisocyanates, such as 2,4-toluylene diisocyanate, mixtures of 2,4- and 2,6-toluylene diisocyanate, 4,4'-, 2,4'- and 2,2'-diphenylmethane diisocyanate, mixtures of 2,4'- and 4,4'-diphenylmethane diisocyanate, urethane-modified liquid 4,4'- and/or 2,4'-diphenylmethane diisocyanates, 4,4'-diisocyanato-1,2-diphenylethane and 1,5-naphthylene diisocyanate. Hexamethylene diisocyanate, isophorone diisocyanate, 1,5-naphthylene diisocyanate, diphenylmethane diisocyanate isomer mixtures containing more than 96% by weight of 4,4'-diphenylmethane diisocyanate, and in particular 4,4'-diphenylmethane diisocyanate are preferably used.

(b) Preferred high molecular weight polyhydroxy compounds (b) having molecular weights of from 500 to 8,000 are polyetherols and polyesterols. However, hydroxyl-containing polymers, for example polyacetals, such as polyoxymethylenes, and especially water-insoluble formals, eg. polybutanediol formal and polyhexanediol formal, and polycarbonates, in particular those based on diphenyl carbonate and hexane-1,6-diol, prepared by transesterification having the abovementioned molecular weights, are also suitable. The polyhydroxy compounds must be predominantly or completely linear, ie. must be bifunctional with regard to the isocyanate reaction. The stated polyhydroxy compounds can be used as individual components or in the form of mixtures.

Suitable polyetherols can be prepared by reacting one or more alkylene oxides where alkylene is of 2 to 4 carbon atoms with an initiator molecule which contains two bonded active hydrogen atoms. Specific examples of alkylene oxides are ethylene oxide, 1,2-propylene oxide and 1,2- and 2,3-butylene oxide. Ethylene oxide and mixtures of 1,2-propylene oxide and ethylene oxide are preferably used. The alkylene oxides can be used individually, alternately one after the other or as a mixture. Examples of suitable initiator molecules are water, aminoalcohols, such as N-alkyldiethanolamines, eg. N-methyldiethanolamine, and diols, such as ethylene glycol, 1,3-propylene glycol, butane-1,4-diol and hexane-1,6-diol. If required, mixtures of initiator molecules may also be used. Other suitable polyetherols are the hydroxyl-containing polymers of tetrahydrofuran (polyoxytetramethylene glycols).

Polyetherols obtained from 1,2-propylene oxide and ethylene oxide and in which more than 50%, preferably from 60 to 80%, of the OH groups are primary hydroxyl groups and some or all of the ethylene oxide is present as a terminal block, and in particular polyoxytetramethylene glycols, are preferably used.

Such polyetherols can be obtained if, for example, the 1,2-propylene oxide is first polymerized on the initiator molecule, followed by the ethylene oxide, or the total amount of 1,2-propylene oxide mixed with some of the ethylene oxide is first copolymerized, and the remainder of the ethylene oxide is then grafted on, or, in a stepwise procedure, some of the ethylene oxide, then the total amount of 1,2-propylene oxide and then the remainder of the ethylene oxide are polymerized onto the initiator molecule.

The essentially linear polyetherols have molecular weights of from 500 to 8,000, preferably from 600 to 6,000, in particular from 800 to 3,500. They can be used either individually or in the form of mixtures with one another.

Suitable polyesterols can be prepared, for example, from dicarboxylic acids of 2 to 12, preferably 4 to 8, carbon atoms and polyhydric alcohols. Examples of suitable dicarboxylic acids are aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, for example in the form of a mixture of succinic, glutaric and adipic acid. Mixtures of aromatic and aliphatic dicarboxylic acids can also be used. For the preparation of the polyesterols, it may be advantageous if, instead of the dicarboxylic acids, the corresponding dicarboxylic acid derivatives, such as dicarboxylates where the alcohol radical is of 1 to 4 carbon atoms, dicarboxylic anhydrides or dicarboxylic chlorides, are used. Examples of polyhydric alcohols are glycols of 2 to 10, preferably 2 to 6, carbon atoms, such as ethylene glycol, diethylene glycol, butane-1,4-diol, pentane-1,5-diol, hexane-1,6-diol, decane-1,10-diol, 2,2-dimethylpropane-1,3-diol, propane-1,3-diol and dipropylene glycol. The polyhydric alcohols can be used alone or, if required, as mixtures with one another, depending on the desired properties.

Other suitable compounds are esters of carbonic acid with the stated diols, in particular those of 4 to 6 carbon atoms, such as butane-1,4-diol and/or hexane-1,6-diol, condensates of ω-hydroxycarboxylic acids, for example ω-hydroxycaproic acid, and preferably polymers of lactones, for example unsubstituted or substituted ε-caprolactones.

Preferably used polyesterols are dialkylene glycol polyadipates where alkylene is of 2 to 6 carbon atoms, for example ethanediol polyadipates, butane-1,4-diol polyadipates, ethanediol butane-1,4-diol polyadipates, hexane-1,6-diol neopentylglycol polyadipates, polycaprolactones and, in particular, hexane-1,6-diol butane-1,4-diol polyadipate.

The polyesterols have molecular weights of from 500 to 6,000, preferably from 800 to 3,500.

(c) Preferred chain extenders (c) having molecular weights of from 60 to 400, preferably from 60 to 300, are aliphatic diols of 2 to 12, preferably 2, 4 or 6, carbon atoms, eg. ethanediol, hexane-1,6-diol, diethylene glycol, dipropylene glycol and in particular butane-1,4-diol. However, diesters of terephthalic acid with glycols of 2 to 4 carbon atoms, eg. bis-(ethylene glycol) terephthalate or bis-butane-1,4-diol terephthalate, hydroxyalkylene ethers of hydroquinone, eg. 1,4-di-(β-hydroxyethyl)-hydroquinone, (cyclo)aliphatic diamines, eg. 4,4'-diaminodicyclohexylmethane, 3,3'-dimethyl-4,4'-diaminodicyclohexanemethane, isophoronediamine, ethylenediamine, 1,2- and 1,3-propylenediamine, N-methyl-1,3-propylenediamine and N,N'-dimethylethylenediamine, and aromatic diamines, eg. 2,4- and 2,6-toluylenediamine, 3,5-diethyl-2,4- and -2,6-toluylenediamine and primary ortho-di-, tri- and/or tetraalkyl-substituted 4,4'-diaminodiphenylmethanes.

In order to adjust the hardness and melting point of the TPU, the molar ratios of the components (b) and (c) can be varied within a relatively wide range. Molar ratios of polyhydroxy compounds (b) to chain extenders (c) of from 1:1 to 1:12, in particular from 1:1.8 to 1:6.4, have proven useful, the hardness and the melting point of the TPU increasing with increasing diol content.

To prepare the TPU, the components (a), (b) and (c), in the presence or absence of catalysts (d), assistants and/or additives (e), are reacted in amounts such that the ratio of the number of equivalents of NCO groups of the diisocyanates (a) to the total number of equivalents of the hydroxyl groups or hydroxyl and amino groups of components (b) and (c) is from 1:0.85 to 1:1.20, preferably from 1:0.95 to 1:1.05, in particular from 1:0.98 to 1:1.02.

(d) Suitable catalysts, which in particular accelerate the reaction between the NCO groups of the diisocyanates (a) and the hydroxyl groups of components (b) and (c), are the prior art tertiary amines, eg. triethylamine, dimethylcyclohexylamine, N-methylmorpholine, N,N'-dimethylpiperazine, 2-(dimethylaminoethoxy)-ethanol, diazabicyclo[2.2.2]octane and the like, and in particular organometallic compounds, such as titanic acid esters, iron compounds, eg. iron(III) acetylacetonate, and tin compounds, eg. tin diacetate, tin dioctoate, tin dilaurate or the dialkyltin salts of aliphatic carboxylic acids, such as dibutyltin diacetate, dibutyltin dilaurate or the like. The catalysts are usually employed in amounts of from 0.001 to 0.1 parts per 100 parts of polyhydroxy compound (b).

In addition to catalysts, it is also possible for assistants and/or additives (e) to be incorporated into components (a) to (c). Examples are lubricants, inhibitors, stabilizers to hydrolysis, light, heat or discoloration, dyes, pigments, inorganic and/or organic fillers and plasticizers The abovementioned assistants and additives are described in more detail in the technical literature, for example in the monograph by J. H. Saunders and K. C. Frisch, High Polymers, Volume XVI, Polyurethane, Part 1 and 2, Interscience Publishers 1962 and 1964, or in German Laid-Open Application DOS No. 2,901,774.

As stated above, the TPU is prepared by the belt method or, preferably, the extrusion method. Specifically, the belt method involves the following procedure: Components (a) to (c) and, if required, (d) and/or (e) are mixed continuously above the melting point of components (a) to (c) with the aid of a mixing head. The reaction mixture is applied to a carrier, preferably a conveyor belt, and is fed through a heated zone. The reaction temperature in this zone is from 60° to 200° C., preferably from 100° to 180° C., and the residence time is from 0.05 to 0.5, preferably from 0.1 to 0.3, hour.

When the reaction is complete, the TPU is allowed to cool and is comminuted or granulated and stored temporarily or processed directly with POM (A), with or without the additives (C), and the additive (D) to give the novel molding materials.

In the extrusion process, the components (a) to (c) and, if required, (d) and (e) are fed individually or as a mixture into the extruder and reacted at from 100° to 250° C., preferably from 140° to 220° C., and the resulting TPU is extruded, allowed to cool, granulated and stored temporarily or likewise further processed directly with POM (A), in the presence or absence of additives (C) and with the additive (D) to give the novel molding materials.

In addition to components (A), (B) and (D), the novel molding materials may contain additives (C).

Examples of suitable additives (C), which may or may not be used, are stabilizers, nucleating agents antistatics, light stabilizers, flameproofing agents, slip agents and lubricants, plasticizers, pigments, dyes, optical brighteners, mold release agents and the like. It has proven particularly useful, and is therefore preferable, to add one or more antioxidants having a phenolic structure. Antioxidants of this type are described in, for example, DE-A-No. 27 02 661.

Particularly suitable heat stabilizers are nylons, amides of polybasic carboxylic acids, amidines, eg. dicyanodiamide, hydrazines, ureas, poly-(N-vinyllactams) and alkaline earth metal salts of aliphatic, preferably hydroxy-containing, monobasic to tribasic carboxylic acids of 2 to 20 carbon atoms, eg. calcium stearate, calcium ricinoleate, calcium lactate and calcium citrate. Oxidation stabilizers used are, in particular, bisphenol compounds, preferably diesters of monobasic 4-hydroxyphenylalkanoic acids of 7 to 13, preferably 7, 8 or 9, carbon atoms with diols of 2 to 6 carbon atoms. Examples of suitable light stabilizers are α-hydroxybenzophenone derivatives and benzotriazole derivatives. The stabilizers are generally used in a total amount of from 0.1 to 5, preferably from 0.5 to 3, % by weight, based on the weight of components (A) and (B)

Other additives (C) which may be used are reinforcing fillers, preferably fibers, eg. carbon fibers or in particular glass fibers, which may be treated with adhesion promoters and/or sizes.

The fibers, which are used in amounts of from 5 to 60, preferably from 10 to 50, % by weight, based on the weight of components (A) and (B), advantageously have a diameter of from 5 to 20 μm, preferably from 8 to 15 μm, and, in the granules, generally have a mean fiber length of from 0.05 to 1 mm, preferably from 0.1 to 0.5 mm.

The novel molding materials can also contain other fillers or reinforcing agents instead of the fibers, in particular glass fibers, or in combination with them. Specific examples are glass spheres, talc, kaolin, wollastonite, mica or chalk, which can be used in amounts of from 3 to 60% by weight, based on the weight of components (A) and (B).

The novel molding materials can be prepared by first incorporating the additive (D) into the POM (A) or into the TPU (B) or into a component (a), (b) and/or (c) for the preparation of the TPU. The resulting concentrate of additive (D) and POM (A) or additive (D) and TPU (B) can then be mixed with untreated TPU (B) or untreated POM (A) and the additive concentration in the novel molding material can be adjusted in this way. In another version of the process, POM and TPU concentrates containing additive (D) can also be mixed provided that the additive concentration (D) in the concentrates is within the amount required for the molding material. In preferred embodiments, however, the components (A), (B), (D) and, if required, (C) of the novel molding materials are mixed directly, or the additive (D) is introduced into a preprepared mixture of POM (A) and TPU (B) or POM/TPU material in the desired ratios. Mixing of components (A), (B), (D) and, where relevant, (C) is advantageously carried out at from 0° to 150° C., preferably from 20° to 100° C. The additive (D) or additive (D) concenirate is incorporated into the POM/TPU material or mixture of POM (A) and TPU (B) at from 50° to 260° C., preferably from 150° to 240° C., components (A) and (B) being, for example, in the free-flowing, softened or molten state, for example by stirring, rolling, kneading or extrusion, using a twin-screw extruder or a kneader.

In the most advantageous and therefore preferably used preparation process for the novel molding materials, the components (A), (B), (D) and, where relevant, (C), in the form of preprepared mixtures or, in particular, individually, are introduced into an extruder, preferably a twin-screw extruder, and melted together at from 150° to 260° C., preferably from 180° to 240° C., the melt is extruded and the extrudates are cooled and then granulated. The granules obtained can be stored temporarily or used directly for the production of moldings.

The novel molding materials have not only good mechanical properties but substantially improved heat stability, less tendency to discoloration and a lower residual formaldehyde content and are useful for the production of, for example, films or preferably moldings by a conventional method, for example by blow molding, extrusion or injection molding. The moldings are used, for example, in the automotive, electrical appliances and electronics industries.

EXAMPLES 1 TO 4 AND COMPARATIVE EXAMPLES A TO D 80 parts by weight or a polyoxymethylene copolymer containing about 3% by weight of butanediol formal and having an MFI of 9 g/10 min at 190° C. and 21.17 N (DIN 53,735), and containing, as an antioxidant, 0.3% by weight of hexane-1,6-diol bis-3-(3,5-di-tert-butyl-4-hydroxyphenyl)-propionate and, as heat stabilizers, 0.1% by weight of a nylon having blocked terminal groups (as described in U.S. Pat. No. 3,960,984, Example 5-4) and 0.3% by weight of a melamine/formaldehyde polycondensate (as described in DE-A-No. 25 40 207, Example 1), 20 parts by weight of a TPU, prepared by reacting 4,4'-diphenylmethane diisocyanate, butane-1,4-diol polyadipate and butane-1,4-diol and having a Shore hardness A of 85, and, if required, 0.1 part by weight of additive (D) or of a comparison substance were mixed at 23° C., and the mixture introduced into a twin-screw extruder (type ZSK 28 from Werner & Pfleiderer), melted together at 220° C. and extruded, the extrudates were granulated and the resulting granules were dried for 15 hours under reduced pressure at 80° C.

To test the heat stability and the tendency to discoloration, the following were determined:

$WL_{N2}$: The weight loss, in percent, of a sample of 2 g of granules on heating for 2 hours at 220° C. under nitrogen.

$WL_{air}$: Weight loss, in percent, of a sample of 1 g of granules on heating for 2 hours at 220° C. under air.

Color: Color of the reweighed material after the $WL_{N2}$ test.

The formaldehyde content of the granules was determined by the following method. A sample of 100 g of granules was refluxed in 150 ml of water for 60 minutes. After this time, the granules were filtered off, 10 ml of a 0.5N sodium sulfite solution of pH 9.1 were added to the water and the mixture was back-titrated with 0.1N sulfuric acid to pH 9.1. The consumption of 0.1N sulfuric acid in ml is V (sample). Furthermore, 150 ml of water were mixed with 10 ml of a 0.5N sodium sulfite solution (pH 9.1) and then back-titrated with 0.1N sulfuric acid or 0.1N sodium hydroxide solution to pH 9.1. The consumption of sulfuric acid or sodium hydroxide solution in ml is $V_{acid}$ (null sample) and $V_{alkali}$ (null sample), respectively.

The formaldehyde content of the granules is then calculated from $$\text{ppm of formaldehyde} = 30\,[V\,(\text{sample}) - V_{acid}\,(\text{null sample})]$$

or $$\text{ppm of formaldehyde} = 30\,[V\,(\text{sample}) - V_{alkali}\,(\text{null sample})].$$

The additives (D) and comparative substances used, which are specified below, and the results obtained are summarized in the Table.

Specification of the additives (D) and comparative substances used:

Ca silicate:

Content of CaO: from 14 to 18% by weight
Content of SiO$_2$: from 60 to 68% by weight
Bulk density: 15 g/100 ml
Loss on ignition: from 15 to 20% by weight
Mean particle size: <50 μm
Mg trisilicate:
  Content of MgO: >20% by weight
  Content of SiO$_2$: >45% by weight
  Ratio of SiO$_2$ to MgO=1.5 mol/mol
  Bulk density: from 25 to 40 g/100 ml
  Mean particle size: from 20 to 40 82 m
  Loss on ignition: from 20 to 30% by weight
Synthetic Mg silicate (=Ambosol® from Societé Nobel Bozel, Puteaux, France):
  Content of MgO: ≧14,8% by weight
  Content of SiO$_2$: ≧59% by weight
  Ratio of SiO$_2$ to MgO=2.7 mol/mol
  Bulk density: from 20 to 30 g/100 ml
  Loss on ignition: <25% by weight
Mg Al silicate:
  Content of MgO: 9% by weight
  Content of Al$_2$O$_3$: 6% by weight
  Content of SiO$_2$: 56% by weight
  Bulk density: 16 g/100 ml
  Loss on ignition: <25% by weight
Talc (3 MgO.4SiO$_2$.nH$_2$O)
  Ratio of SiO$_2$ to MgO=1.33 mol/mol
  Mean particle size: <20 μm
  Loss on ignition: <30% by weight
Wollastonite (CaO.SiO$_2$)
  Ratio of SiO$_2$ to CaO=1 mol/mol
  Mean particle size: <10 μm
  Bulk density: 30 g/100 ml
  Content of CaO: 43% by weight
  Content of SiO$_2$: 50.5% by weight
  Loss on ignition: <5% by weight
Silica gel (SiO$_2$)
  Mean particle size: 5 μm
  Loss on ignition: from 5 to 8% by weight
  Pore volume: about 1 cm$^3$/g

We claim:
1. An improved molding composition comprising a mixture which contains:
  (a) a polymeric blend consisting of from 40 to 95% by weight of one or more polyoxymethylene polymers selected from the group consisting of polyoxymethylene homopolymers, polyoxymethylene compolymers and mixtures thereof and from 60 to 5.0% by weight of one or more thermoplastic polyurethane elastomers; and
  (b) an additive consisting of one or more alkaline earth silicates of the formulas

MeO.xSiO$_2$.nH$_2$O where Me is an alkaline earth metal, x is a number ranging from 1.4 to 10.0 and n is a number which is equal to or greater than zero, and wherein said additive is present in an amount of from 0.005 to 2.0% by weight based on the total weight of the polymeric blend as defined in (a) above.
2. The molding composition according to claim 1, wherein said alkaline earth metal is selected from the group consisting of calcium and magnesium.
3. The molding composition according to claim 1, wherein the alkaline earth metal silicate has a means particle size of less than 100 microns.
4. A method for improving the heat stability of molding compositions based on blends of high molecular weight polyoxymethylenes and thermoplastic polyurethane elastomers which comprises introducing into said compositions an additive which consists of one or more alkaline earth silicates of the formula MeO.xSiO$_2$.nH$_2$O where Me is an alkaline earth metal, x is a number ranging from 1.4 to 10.0 and n is a number which is equal to or greater than zero, and wherein said additive is introduced in an amount of from 0.005 to 2.0 by weight based on the total weight of the polymer blend.

* * * * *

TABLE

| Examples | Comparative Examples | Additive (D) | Comparative substance | WL$_{N2}$ [% by wt.] | WL$_{air}$ [% by wt.] | Color | Formaldehyde in the granules [ppm] |
|---|---|---|---|---|---|---|---|
| 1 | | calcium silicate | — | 0.10 | 0.67 | pale brown | 63 |
| 2 | | magnesium trisilicate | — | 0.10 | 0.68 | beige | 53 |
| 3 | | synth. magnesium silicate | — | 0.09 | 0.62 | beige | 60 |
| 4 | | magnesium aluminum silicate | — | 0.11 | 0.65 | pale brown | 74 |
| | A | — | — | 0.78 | 1.56 | dark brown | 110 |
| | B | — | silica gel | 0.53 | 1.46 | dark brown | 121 |
| | C | — | wollastonite | 0.65 | 1.74 | dark brown | 109 |
| | D | — | talc | 0.83 | 2.01 | dark brown | 172 |